Figure 1:
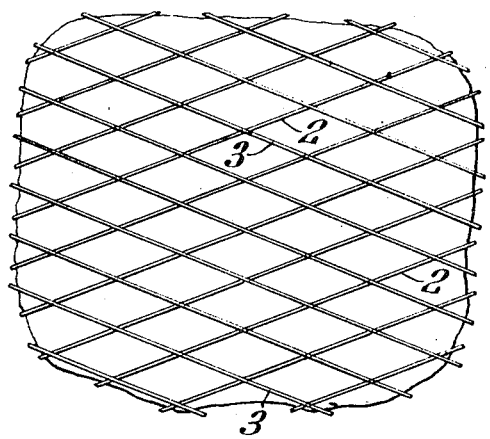

May 13, 1969 K. M. HILLAS 3,444,025
METHOD OF BONDING NON-WOVEN SCRIM
Filed Dec. 21, 1965

INVENTOR
KENNETH M. HILLAS
BY J. Hart Evans
ATTORNEY

# 3,444,025
METHOD OF BONDING NON-WOVEN SCRIM
Kenneth M. Hillas, Boonton, N.J., assignor to Union Carbide Corporation, a corporation of New York
Filed Dec. 21, 1965, Ser. No. 515,474
Int. Cl. B32b 31/26
U.S. Cl. 156—306          7 Claims This invention relates to the manufacture of bonded non-woven scrim.

Non-woven scrim, that is, a non-woven fibrous product in which the spaced apart strands thereof are formed in at least two unbonded layers of parallel strands have been widely employed in the reinforcement of plastic, paper and non-woven mats. However, in order to use such products, it has been necessary to interbond the strands of each layer with strands in the other layer. Typically, this has been accomplished by coating the strands with adhesive or by laminating the scrim between plastic and/or paper films.

The adhesive bonding technique of forming an integral product from such scrim creates considerable difficulties. First of all, it is difficult to get enough adhesive at the points where the strands cross because of the open structure and light weight of the scrim. Moreover, adhesive bonding results in substantial losses of adhesive. Such a technique is extremely costly and, at best, does not make a scrim product which has good tear resistance.

In the plastic lamination process, already bonded scrim is typically fed between two rolls of plastic into hot calender or lamination rolls. These rolls are at high temperatures, usually above the softening temperature of the plastic and, because of the openness of the scrim, each layer of plastic adheres to the other but not directly about the strands. In effect, the scrim product is only loosely encapsulated by the multiple plastic layers. As a result, the scrim is capable of movement between the two layers, constantly shifting position according to the tension exerted on the laminate, and quite often the scrim strands in each layer bunch together so that the fiber reinforcement becomes localized and the plastic layers become separated. The net result is an inferior product with limited utility.

There is described herein a process and a product therefrom which avoids the difficulties described above. The product of this invention is very simple to make and the fibers of the scrim are very securely locked such that when the scrim is used in plastic laminate formation, the fibers do not bunch up when the laminate is placed under tension.

The process of this invention involves placing a thin layer of thermoplastic resin, typically having a thickness not in excess of about 5 mils, preferably not in excess of 2 mils, on top of a non-woven unbonded scrim, as described above, and feeding the scrim with its attendant layer into a heated zone provided at a temperature above the melting point of the resin. As a result, the plastic layer on top of the scrim collapses between the strands of the scrim, wraps itself about the crossing strands of the scrim at the point where said strands cross and then melts at those portions of the film resting in the space between the strands of the scrim. As a result, the plastic layer melts apart and completely coats the scrim product, thus bonding the strands together and the scrim still has the open structure characteristic of scrim. In a significant embodiment of this invention, all of the strands of the scrim contain thermoplastic resin which is melted about them.

The advantage of the above process resides in the ability to provide a definite amount of thermoplastic bonding resin on the scrim in order to achieve a certain degree of bonding between the scrim strands. Moreover, no plastic is lost since essentially all of it stays on the scrim during the bonding process. This results in maximum utilization of the bonding resin and minimum loss of bonding resin as waste. Moreover, the scrim maintains its density as a scrim and then can be used, per se, as a fabric material. A further advatage of the process of this invention resides in the fact that the bonding resin employed is in 100 percent solid condition and thus the process does not suffer from the requirement of solvent loss or solvent recovery, hence eliminating potential fire hazards, gumming up of equipment and the like problems.

A further advantage of the process of this invention is that it provides a sufficient amount of resin on the scrim so that if one desires to bond the scrim to another plastic, the bonding resin can be employed as an adhesive. The advantages of this technique reside in the fact that additional adhesive is not required, or that the strands of the scrim do not have to participate in attempting to effect adhesion to a plastic film. Thus the maximum strength of scrim in effecting reinforcement of plastic or paper articles is achieved.

Illustrative of thermoplastic resins which may be utilized in bonding the scrim include polyethylene, polyvinylchloride, copolymers of vinyl chloride and vinyl acetate, polypropylene, polyhexamethyleneadipamide, polyepsilon-caprolactam, polyethyleneterephthalate and other thermoplastic polyesters, thermoplastic polyurethanes, polyacrylates, and the like.

The non-woven scrim product may be made of strands of any one of a broad variety of fibers such as polyethylene fibers, polypropylene fibers, mixtures of polyethylene and polypropylene fibers, nylon fibers (such as the nylons described above), polyester fibers (such as the polyesters described above), acrylic and modacrylic fibers such as polyacrylonitrile fibers and acrylonitrile and vinylchloride copolymer fibers, polystyrene fibers, polyvinylacetate fibers, polyvinylchloride fibers, cellulose acetate fibers, glass fibers and viscose fibers. In addition to the above synthetic fibers there may also be used the natural fibers such as cotton, wool, hogs hair, horse hair, vicuna, and the like.

The temperature at which heating of the resin film takes place is above the melting temperature of the resin film, but, however, the temperature should be below the decomposition temperature of the resin film. The amount of time which the resin film is heated when provided over the scrim is typically sufficient to melt the plastic so that it is melted onto and into the scrim strands and achieves open spaces between the strands of the scrim. Generally, heating does not exceed one-half (½) hour, preferably does not exceed 10 minutes, and desirably, does not exceed 5 minutes.

The process of this invention is most favorably operated by suspending the scrim by holding its ends with a pintenter frame. On top of the scrim is laid the plastic film and the scrim with the film is placed in an oven having a temperature at least equal to the melting temperature of the resin film. When the film melts in the oven causing it to break-up and create open spaces between the scrim strands, the scrim product may be removed from the oven and cooled.

Figure 2:
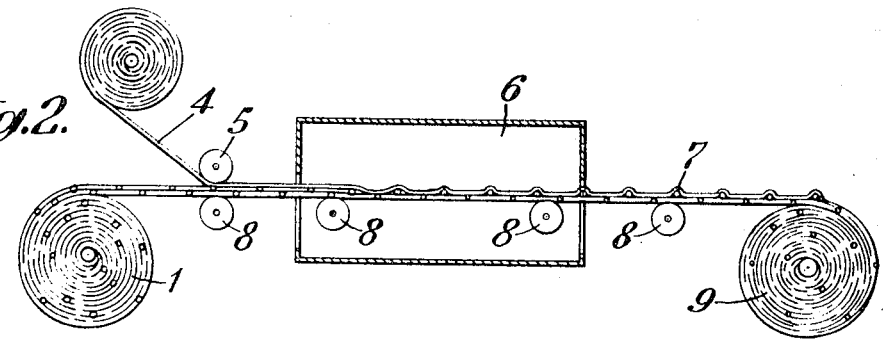
Figure 3:
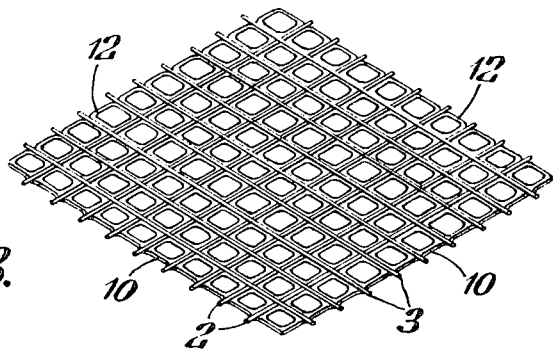
Figure 4:
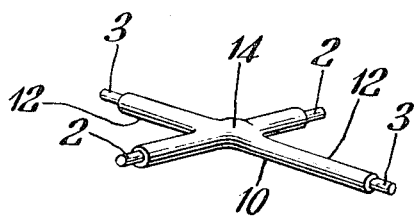

In the drawing:
FIGURE 1 is a top view of an unbonded scrim suitable for use in the invention;
FIGURE 2 is a side view and partial section schematically illustrating the bonding operation;
FIGURE 3 illustrates the bonded scrim product;
FIGURE 4 is an enlarged view of an intersection of bonded scrim fibers from the bonded scrim of FIGURE 3.

With respect to FIGURE 1, there is illustrated a non-woven scrim possessing parallel strands 3 and parallel strands 2 wherein strands 2 and 3 exist in different planes.

As can be seen from FIGURE 1, the parallel strands have open spaces between them and, viewing the scrim as a whole, there are open spaces existing between the combinations of strands 2 and 3 forming the scrim pattern.

In the process illustrated in FIGURE 2, a roll of scrim 1 is unwound and a scrim is passed over a series of rollers 8, while a resin layer 4 is unwound from a roll and placed on top of the scrim. Compression roller 5 serves the purpose of aligning resin layer 4 of scrim 1 and the combination of scrim 1 and layer 4 is passed into oven 6 heated to a temperature above the melting temperature of resin layer 4. While in the oven, layer 4 is melted and caused to collapse between the strands of the scrim, wrapping itself around the strands and completely coating the strands of the scrim resulting in bonded scrim 7. Bonded scrim 7 is collected on roller 9.

In FIGURE 3 can clearly be seen the holes 12 which appear between the strands 2 and 3, which strands have been coated by the resin layer 10. In FIGURE 4 this is further illustrated and the form coating at the junction 14 of the strands 2 and 3 is clearly depicted.

The bonded scrim may be laminated to plastic or paper by conventional methods utilizing the bonding resin already in the scrim as an adhesive between the plastic or paper and the scrim. Desirably, the plastic film which is employed to bond the scrim should be melt compatible with the binding resin in the scrim so that the scrim and the plastic film can be interbonded with heat alone. However, the scrim can be bonded to plastic or paper with other adhesives. Suitable adhesives include the rubber adhesives such as natural or synthetic rubber solutions, polyvinylchloride solutions, polyvinylacetate solutions, copolymers of vinyl acetate and vinyl chloride, copolymers of vinyl acetate, vinyl chloride and acrylic acid, nitrocellulose adhesive, ethylcellulose adhesive, animal glues, and the like. The selection of adhesive is not critical to this invention unless the particular utility to which the total laminate is to be employed requires optimum adhesion between the plastic layer and the film.

What is claimed is:

1. A process for bonding non-woven scrim which comprises covering a non-woven scrim composed of at least two unbonded layers of essentially parallel spaced-apart strands with a layer of thermoplastic resin and then heating said layer of thermoplastic resin at a temperature above the melting temperature of the resin for a period of time sufficient to cause the layer of resin to deform under its own weight so as to collapse around and thus coat the strands of said scrim, thereby forming openings in the resin layer between the thus-coated strands of scrim, and then cooling the coated scrim below the heat deformation temperature of the resin.

2. A process according to claim 1 wherein the covered scrim is suspended from its edges while being heated so as to facilitate the collapse of the resin layer and subsequent coating of the strands of the scrim.

3. A process according to claim 1 wherein the bonded scrim thus produced is laminated with a thermoplastic film.

4. A process according to claim 1 wherein said resin is a vinyl chloride polymer.

5. A process according to claim 1 wherein said resin is polyethylene.

6. A process according to claim 3 wherein said resin is a vinyl chloride polymer and said film comprises a vinyl chloride polymer.

7. A process according to claim 3 wherein said resin is a polyethylene resin and said film is polyethylene.

References Cited

UNITED STATES PATENTS

| | | | |
|---|---|---|---|
| 3,245,854 | 4/1966 | Etchison | 156—148 |
| 3,147,820 | 9/1964 | Finger | 161—112 X |
| 2,772,993 | 12/1956 | Magnuson | 161—92 X |
| 2,418,904 | 4/1947 | Rugeley et al. | 156—306 X |

OTHER REFERENCES

W. J. Roff, Fibers, Plastics and Rubbers, 1956, pp. 309–310.

ROBERT F. BURNETT, *Primary Examiner.*

M. A. LITMAN, *Assistant Examiner.*

U.S. Cl. X.R.

161—113, 89, 92; 156—82, 178; 264—174